(12) United States Patent
Churei

(10) Patent No.: US 6,414,299 B1
(45) Date of Patent: Jul. 2, 2002

(54) METHOD OF MOUNTING OPTICAL SENSOR PACKAGE

(75) Inventor: Kiyokazu Churei, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/499,301

(22) Filed: Feb. 7, 2000

(30) Foreign Application Priority Data

Feb. 17, 1999 (JP) ............................................. 11-038412

(51) Int. Cl.$^7$ .................................................. H01J 3/14

(52) U.S. Cl. ................. 250/214.1; 250/216; 250/201.2; 250/239

(58) Field of Search .............................. 250/214.1, 216, 250/201.2, 201.4, 208.1, 239; 396/304

(56) References Cited

U.S. PATENT DOCUMENTS

| 4,055,761 A | * 10/1977 | Shimomura ................. 250/216 |
| 5,153,429 A | * 10/1992 | Takahashi .................... 250/216 |
| 5,270,534 A | * 12/1993 | Huiberts et al. ............ 250/216 |

FOREIGN PATENT DOCUMENTS

JP          8-62491      3/1996

* cited by examiner

*Primary Examiner*—Stephone Allen
(74) *Attorney, Agent, or Firm*—Fitzpatrick, Cella, Harper & Scinto

(57) ABSTRACT

A method of mounting an optical sensor package, in which the optical sensor package includes a chip on which an optical sensor is formed, where a part of the chip is exposed, including the steps of forming in a mounting member a concave portion corresponding to the outer shape of the exposed chip portion, and fitting and fixing the exposed chip portion into the concave portion of the mounting member.

13 Claims, 3 Drawing Sheets

METHOD OF MOUNTING OPTICAL SENSOR PACKAGE

BACKGROUND OF THE INVENTION

1. Field of the Invention

The present invention relates to a method of mounting an optical sensor package in which an optical sensor package such as a charge coupled device (CCD) or the like used, for example as a distance measuring device for an automatic focusing device for a camera, can be accurately mounted on a mounting member.

2. Related Background Art

A current optical sensor has been used in various apparatuses. For example, a subject distance is measured with an optical sensor even in an autofocusing apparatus for a camera. After the optical sensor which is used therein is formed on a chip, it is generally sealed with resin or the like to be packaged.

FIG. 6 shows a structure of such optical sensor package 55. As shown in FIG. 6, a chip 52 on which an optical sensor 51 is formed is wire-bonded to a lead frame 53 and the entire sensor package is sealed with resin 54. Further, the mounting method for the optical sensor package has been variously proposed.

FIG. 5 is a general optical sensor package disclosed in Japanese Laid-Open Patent Application No. 8-62491. As shown in FIG. 5, an optical sensor package 45 shown in FIG. 6, which is soldered to be mounted on a flexible printed-circuit board (hereinafter referred to as FPC) 49 is held on a holding member 48. That is, the resin 44 which seals the chip 42 is held on the holding member 48 and the holding member 48 is mounted on a base plate 46. A position control of the optical sensor 41 is performed by providing a tool (not shown) on the holding member 48 and handling this tool.

However, in the mounting method for the optical sensor package shown in FIG. 5, the resin which seals the chip 42 of the optical sensor package 45 is held on the holding member 48. Thus, there are the following disadvantages.

Since the optical sensor package 45 generally has a large error in the outer diameter, for example, the concave portion 48a of the holding member 48 should be designed in large scale so that the error can be absorbed by the holding member 48, resulting in a large holding member 48.

Further, the large error in the outer diameter of the package 45 causes even a position shift of the optical sensor 41 with respect to an image formation lens 47 mounted on the base plate 46. Accordingly, an amount of adjustment for the correction of the position shift must be increased and provision of a large space in a mounting portion for the optical sensor package 45 is needed. Therefore, a size of the whole package mounting portion is increased.

Further, this adjustment of the position shift is carried out by moving the holding member 48 holding the optical sensor package 45. Thus, the tool force can also act on the optical sensor package 45 as an undesirable stress, and the accuracy of the adjustment can be deteriorated.

On the other hand, recently, an optical sensor package 65 shown in FIG. 7 in which a part of a chip 62, on which an optical sensor package 65 is formed, is three-dimensionally exposed has been also proposed. Such optical sensor package 65 is formed such that the sensor surface is directly bonded to one side of an FPC 63 and a protective glass member 64 is connected to the other side of the FPC 63.

SUMMARY OF THE INVENTION

An object of the present invention is to solve the above-mentioned problems. Specifically, an object of the present invention is to provide a method of mounting an optical sensor package in which the optical sensor package can be accurately mounted on a mounting member.

Another object of the present invention is to provide a method of mounting an optical sensor package in which by using an optical sensor package having a chip on which an optical sensor was formed, a part of the chip being exposed, the exposed chip portion can be directly mounted on a mounting member.

Still another object of the present invention is to provide a method of mounting an optical sensor package in which the optical sensor package can be mounted by using an optical sensor package having a chip on which an optical sensor was formed, a part of the chip being exposed, forming a concave portion corresponding to the outer shape of the exposed chip portion in a mounting member, and fitting the exposed chip portion into the concave portion of the mounting member.

Still another object of the present invention is to provide a method of mounting an optical sensor package in which an exposed chip in the optical sensor package can be mounted on a mounting member through a holding member or a receiving member on the holding member.

DESCRIPTION OF THE PREFERRED EMBODIMENTS

Examples of the present invention will be described below with reference to drawings. First, Example 1 will be described.

EXAMPLE 1

Figure 1:
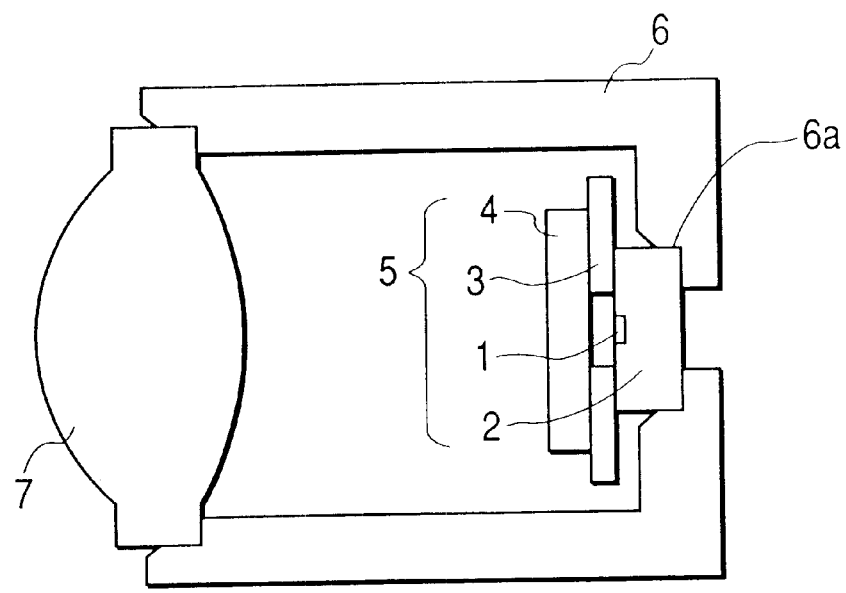
FIG. 1 is a view for explaining a method of mounting an optical sensor package of Example 1 according to the present invention.

FIG. 1 shows Example 1 of the present invention. In FIG. 1 the reference numeral 1 denotes an optical sensor. The optical sensor 1 is formed on a chip 2. In this chip 2, a bump (not shown) is formed on the surface where the optical sensor 1 is formed. The chip 2 is bonded to a pad (not shown) around an opening of an FPC 3. The reference numeral 4 denotes a protective glass 4. The protective glass 4 is connected to a surface of the FPC 3 opposite the chip 2 so as to protect the optical sensor 1. An optical sensor package 5 is formed as stated above so that the chip 2 is three-dimensionally exposed.

The reference numeral 6 is a mounting member. The mounting member 6 corresponds to an AF base plate or the like in, for example, a camera. The mounting member 6 is formed with a concave portion 6a having a size corresponding to the outer shape of the chip 2 and also an image forming lens 7 for image forming light to be detected on the optical sensor 1 is fixed to the mounting member 6. Mounting of the optical sensor package 5 onto the mounting member 6 is performed by fitting the back of the chip 2 with suitable method such as adhesion. Since the outer shape of the chip 2 can be generally machined with high accuracy, the size of the concave portion 6a is set to a size slightly larger than the outer shape of the chip 2 so that the chip 2 can be held by the mounting member with high accuracy. Further, the optical sensor 1 can also be generally positioned on the chip 2 with high accuracy so that the optical sensor 1 can also be held and mounted relative to the image forming lens 7 with high accuracy.

EXAMPLE 2

Figure 2:
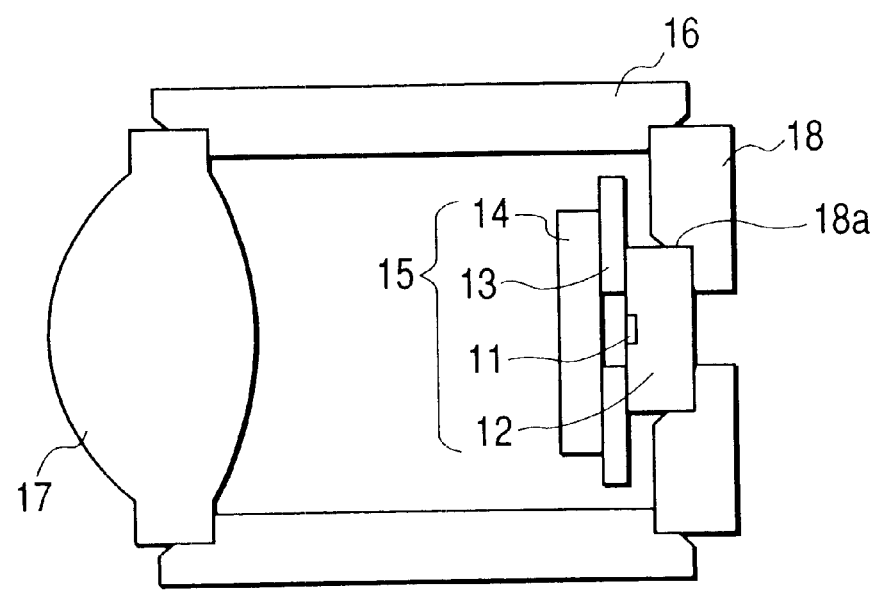
FIG. 2 is a view for explaining a method of mounting an optical sensor package of Example 2 according to the present invention.

Example 2 of the present invention is shown in FIG. 2. Example 2 assumes a case where the concave portion 6a can not be provided in the mounting member 6 unlike Example 1 for reasons of light-shielding or shape requirements and the like. In FIG. 2, the reference numeral 15 is the identical optical sensor package as that described in Example 1. Therefore, the explanation of the optical sensor package is omitted.

The reference numeral 16 is a mounting member. The mounting member 16 corresponds to an AF base plate or the like in, for example, a camera. An image forming lens 17 for image forming light to be detected on the optical sensor 11 is fixed to the mounting member 16. The reference numeral 18 denotes a holding member. Mounting of the optical sensor package 15 onto the holding member 18 is performed by fitting the back of the chip 12 into the concave portion 18a and fixing the chip 12 with suitable method such as adhesion. Since the outer shape of the chip 12 is generally machined with high accuracy, the size of the concave portion 18a is set to a size slightly larger than the outer shape of the chip 12 so that the chip 12 can be held by the holding member 18 with high accuracy. Further, the optical sensor 11 can also be generally positioned on the chip 12 with high accuracy. Thus, the holding member 18 is formed with high accuracy so that the optical sensor 11 can also be held and mounted relative to the image forming lens 17.

EXAMPLE 3

Figure 3:
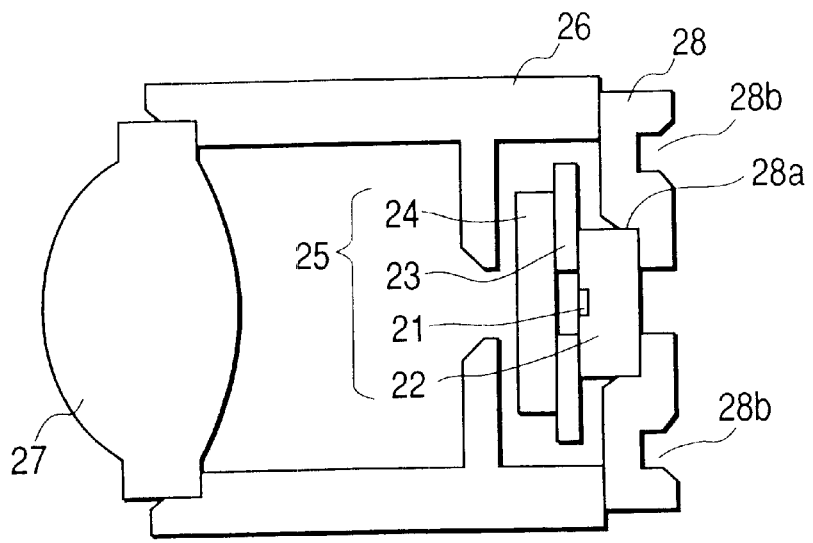
FIG. 3 is a view for explaining a method of mounting an optical sensor package of Example 3 according to the present invention.

Example 3 of the present invention is shown in FIG. 3. Example 3 assumes a case where an adjustment of the position of an optical sensor is inevitable because of high measurement accuracy. In FIG. 3, the reference numeral 25 is the identical optical sensor package as that described in Example 1. Therefore, the explanation of the optical sensor package is omitted. The reference numeral 26 is a mounting member. The mounting member 26 corresponds to an AF base plate or the like in for example a camera. An image forming lens 27 for image forming light to be detected on the optical sensor 21 is fixed to the mounting member 26. The reference numeral 28 denotes a holding member. The holding member 28 is formed with an engagement portion 28b to engage an adjusting tool (not shown).

Mounting of the optical sensor package 25 onto the holding member 28 is performed by fitting the back of the chip 22 into the concave portion 28a and fixing the chip 22 with suitable method such as adhesion. Since the outer shape of the chip 22 is generally machined with high accuracy, if the size of the concave portion 28a is set to a size slightly larger than the outer shape of the chip 22, the chip 22 can be held by the holding member 28 with high accuracy. Further, the optical sensor 21 can also be generally positioned on the chip 22 with high accuracy. Therefore, a so called adjustment clearance by an adjusting tool may absorb errors in a range of the above-mentioned high accuracy, that is, a position deviation of the optical sensor 21 on the chip 22, a play between the chip 22 and the concave portion 28a of the holding member 28, and an outer shape error of the holding member 28 with respect to the concave portion 28a, so that the optical sensor 21 can be held and mounted in a necessary and minimum space while adjusting the position of the optical sensor 21 with high accuracy.

EXAMPLE 4

Figure 4:
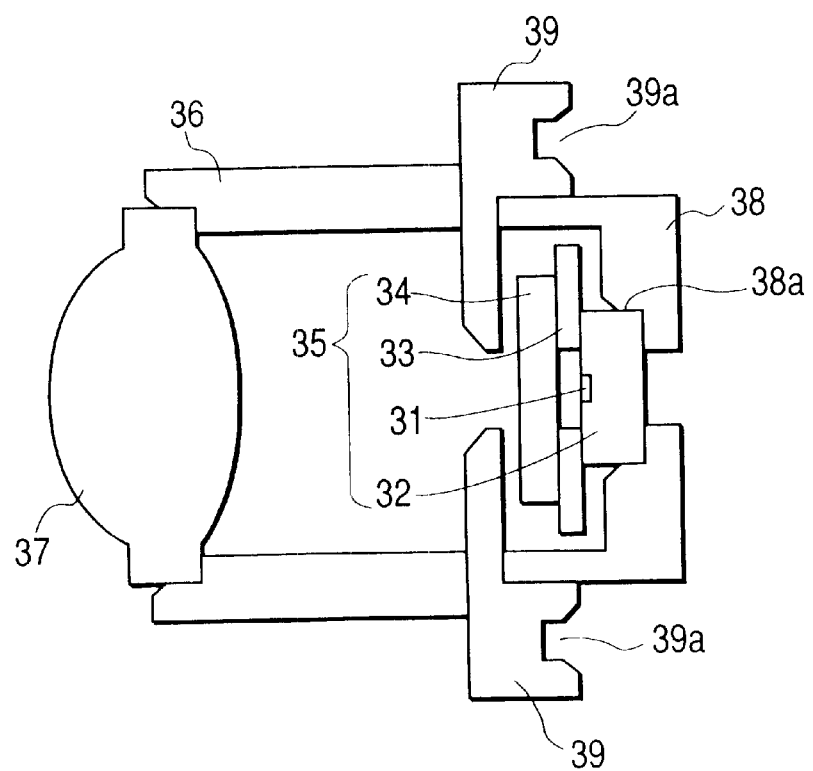
FIG. 4 is a view for explaining a method of mounting an optical sensor package of Example 4 according to the present invention.
Figure 5:
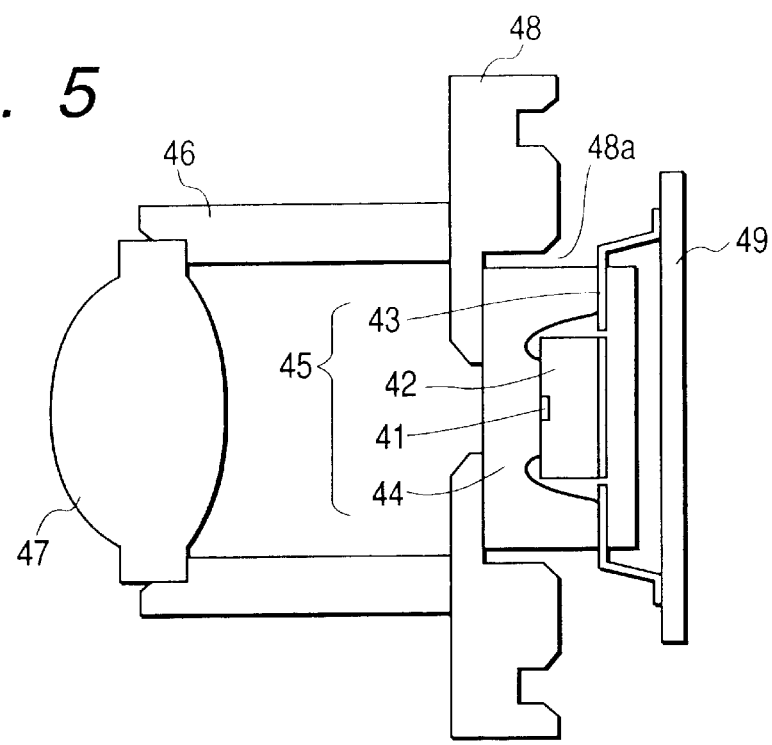
FIG. 5 is a view of a general optical sensor package.
Figure 6:
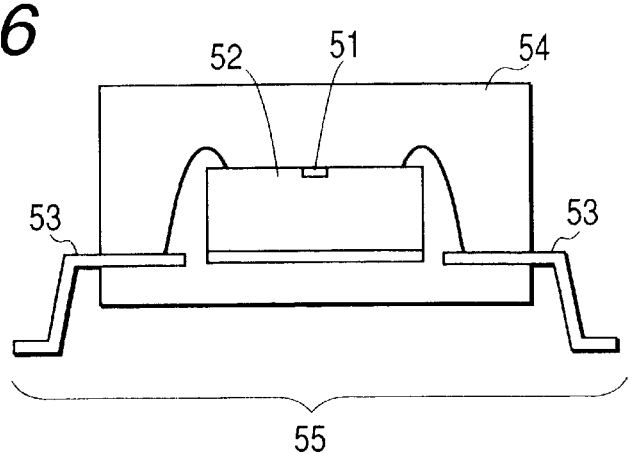
FIG. 6 is a view for explaining a conventional method of mounting an optical sensor package.
Figure 7:
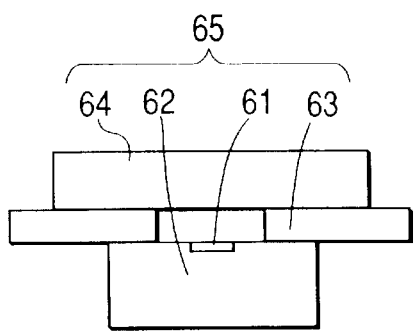
FIG. 7 is a view of an optical sensor package in which a part of chip was three-dimensionally exposed.

Example 4 of the present invention is shown in FIG. 4. Example 4 assumes a case where an adjustment of the position of an optical sensor is inevitable because of very high measurement accuracy. In FIG. 4, the reference numeral 35 is the identical optical sensor package as that described in Example 1. Therefore, the explanation of the optical sensor package is omitted. The reference numeral 36 is a mounting member. The mounting member 36 corresponds to an AF base plate or the like in, for example, a camera. An image forming lens 37 for image forming light to be detected on the optical sensor 31 is fixed to the mounting member 36. The reference numeral 38 denotes a holding member. The holding member 38 is positioned at a receiving member 39 and fixed thereto. The holding member 38 is formed with an engagement portion 38b to engage an adjusting tool (not shown).

Mounting of the optical sensor package 35 onto the holding member 38 is performed by fitting the back of the chip 32 into the concave portion 38a and fixing the chip 32 with suitable method such as adhesion. Since the outer shape of the chip 32 is generally machined with high accuracy, if the size of the concave portion 38a is set to a size slightly larger than the outer shape of the chip 32, the chip 32 can be held by the holding member 38 with high accuracy. Further the optical sensor 31 can also be generally positioned on the chip 32 with high accuracy. Therefore, if the so called adjustment clearance by an adjusting tool ensures only the absorption of errors in a range of the abovementioned high accuracy, that is, a position shift of the optical sensor 31 on the chip 32, a rattle between the chip 32 and the concave portion 38a of the holding member 38, an outer shape error of the holding member 38 with respect to the concave portion 38a, a mounting error between the holding member 38 and the receiving member 39, and an outer error of the receiving member 39, the optical sensor 31 can be held and mounted in a necessary and minimum space while adjusting the position of the optical sensor 31 with high accuracy.

As described above, according to the present invention, it has been found that an optical sensor package can be mounted on a mounting member with high accuracy by selecting an optical sensor package in which a part of the highest accurate chip on which an optical sensor is formed is exposed from conventional various types of optical sensor packages, using the highest accurate chip portion in the mounting, and directly mounting the exposed chip of the optical sensor package on the mounting member.

That is, the present invention first uses an optical sensor package in which a part of a chip on which an optical sensor is formed is exposed, second forms a concave portion having a size corresponding to the outer shape of the exposed part of the chip in the inner surface of the mounting member, and third fits the chip to the concave portion of the mounting member so as to fix it in a manner that the chip drops down into the concave portion from the exposed portion on the back of the chip. In a case where the mounting member is used as a supporting frame of an image forming lens, the image forming lens is fixed to one side of this supporting frame and the concave portion is provided on the inner surface of the other side of the supporting frame. Further, a flexible printed circuit board provided between the chip and a protective glass is provided with an opening portion for image-forming light transmitted through the image forming lens.

Further, although in the present invention the exposed chip of the optical sensor package is mounted on a mounting member, it can be mounted on the mounting member through a holding member or a receiving member on the holding member with high accuracy.

Thus, first, in the present invention, an exposed chip portion of the optical sensor package is mounted on a mounting member and the chip itself is mounted on the mounting member. Therefore, the chip can be held and mounted with high accuracy.

Second, in the present invention, a holding member holds an exposed chip portion of the optical sensor package and the holding member is mounted on a mounting member. Thus, the chip itself is mounted on the mounting member while being held by the holding member. Consequently, the chip can be held and mounted with high accuracy.

Third, in the present invention, a portion having a shape for adjusting the mounting position by a tool is formed in the holding member, and the holding member which holds a chip with accuracy is adjusted, Accordingly, the position of an optical sensor can be adjusted in the minimum space.

Fourth, in the present invention, a holding member holds an exposed chip portion of the optical sensor package and the holding member is mounted on a mounting member through a receiving member, and at the same time, a portion having a shape for adjusting the mounting position by a tool is formed in the receiving member. Thus, stress on the adjustment is difficult to apply on the holding member on which the chip was held with high accuracy. Accordingly, the position of an optical sensor can be adjusted in the minimum space with high accuracy.

Fifth, in the present invention, the optical sensor is a sensor for measuring distance in an automatic focusing device. Therefore, an autofocusing optical sensor package can be accommodated in a camera in the minimum space with high accuracy.

What is claimed is:

1. A method of mounting an optical sensor package comprising the steps of:
   providing an optical sensor package in which a chip on which an optical sensor is formed is partially exposed;
   providing a holding member formed with a concave portion having a size corresponding to the outer shape of the exposed portion of said chip;
   providing a receiving member on which said holding member is mounted;
   providing a mounting member on which said receiving member is mounted;
   mounting said holding member on said mounting member through said receiving member; and
   fitting and fixing the exposed portion of said chip into the concave portion of said mounting member so that said optical sensor package is mounted.

2. A method of mounting an optical sensor package according to claim 1, wherein said mounting member is a supporting frame of an image forming lens, said image forming lens being fixed to one side of the supporting frame and said holding member being mounted on the other side of the supporting frame through said receiving member, and wherein the exposed portion of said chip is fitted and fixed into a concave portion of the holding member, said flexible printed circuit board has an opening portion in a portion corresponding to the position of the optical sensor on said chip, and light transmitted from said image forming lens through said opening portion is imaged on the optical sensor on said chip.

3. A method of mounting an optical sensor package according to claim 2, wherein said receiving member has a shape for adjusting the mounting position by a tool.

4. A method of mounting an optical sensor package according to claim 2, wherein said optical sensor is a sensor for measuring a distance in an autofocusing device.

5. A method of mounting a distance measuring optical sensor package comprising the steps of:
   providing an optical sensor package in which a part of a chip on which an optical sensor is formed is partially exposed;
   forming a supporting portion of an image forming lens on one side of a supporting frame, and forming a concave portion having a size corresponding to the outer shape of the exposed portion of said chip on the other side of the supporting frame; and
   fitting and fixing the exposed portion of said chip into the concave portion of said supporting frame so that said optical sensor package is mounted on said mounting member, whereby light transmitted through said image forming lens is imaged on the optical sensor of said chip.

6. A method of mounting an optical sensor package according to claim 5, wherein said optical sensor package has a protective glass for protecting the optical sensor on said chip and a flexible printed circuit board to which a surface of said optical sensor is directly bonded between said chip and said protective glass.

7. A method of mounting an optical sensor package according to claim 6, wherein said flexible printed circuit board has an opening portion in a portion corresponding to the position of the optical sensor on said chip, and light transmitted from said image forming lens through the opening portion is imaged on the optical sensor on said chip.

8. A method for attaching a sensor package having as a unit a sensor chip formed with a sensor and a protective plate provided on a side of said sensor to protect said sensor, said method comprising the steps of:
   providing the sensor chip of the sensor package with an exposed contoured portion; and
   directly fitting and securing the exposed contoured portion of the sensor chip into a recess portion of a holding member, the recess portion having a size corresponding to the exposed contoured portion of the sensor chip different from the protective plate.

9. A method according to claim 8, wherein the holding member is provided with an imaging lens.

10. A method according to claim 8, further comprising adjusting and fitting a position of the holding member with respect to a lens holding member for holding an imaging lens.

11. An arrangement for attaching a sensor package having as a unit a sensor chip formed with a sensor and a protective plate provided on a side of said sensor to protect said sensor, wherein an exposed contoured portion of said sensor chip is directly fitted and fixed into a recess portion of a holding member, the recess portion having a size corresponding to the exposed contoured portion of said sensor chip different from said protective plate.

12. An arrangement according to claim 11, wherein said holding member is provided with an imaging lens.

13. An arrangement according to claim 11, wherein a position of said holding member is adjustable and fixable with respect to a lens holding member for holding an imaging lens.

* * * * *